Jan. 2, 1968   F. P. ELLZEY   3,361,084
MONORAIL STRUCTURE AND SYSTEM CONTROL
Filed Oct. 24, 1965   3 Sheets-Sheet 1
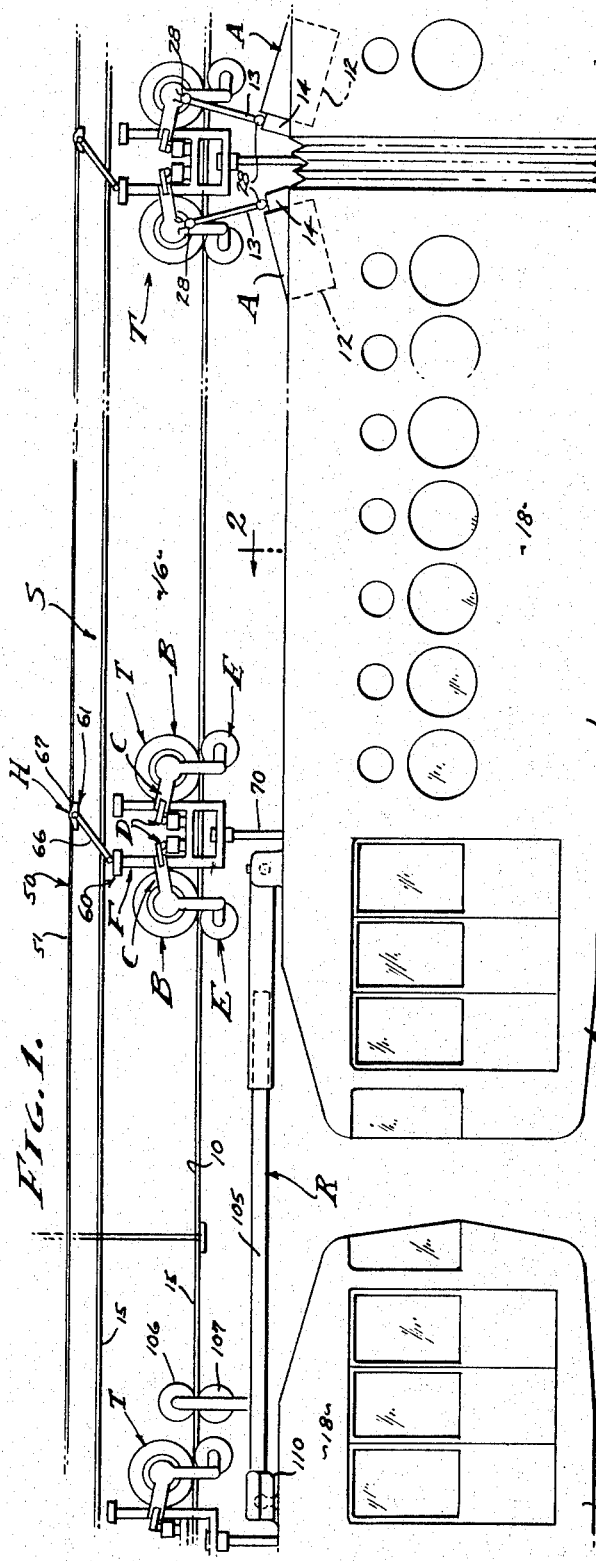
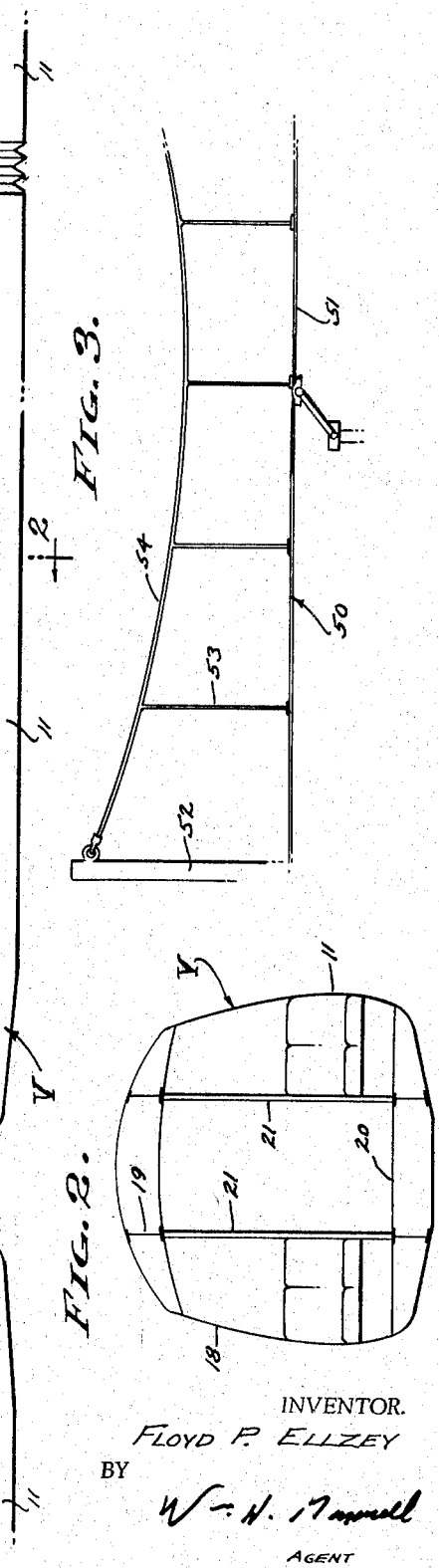
INVENTOR.
FLOYD P. ELLZEY
BY
AGENT

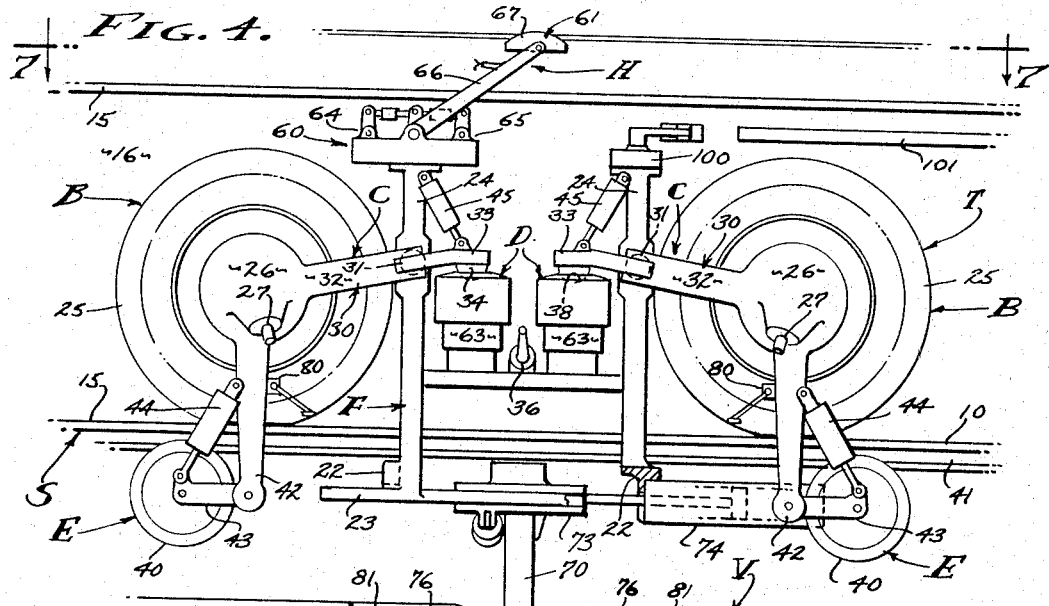
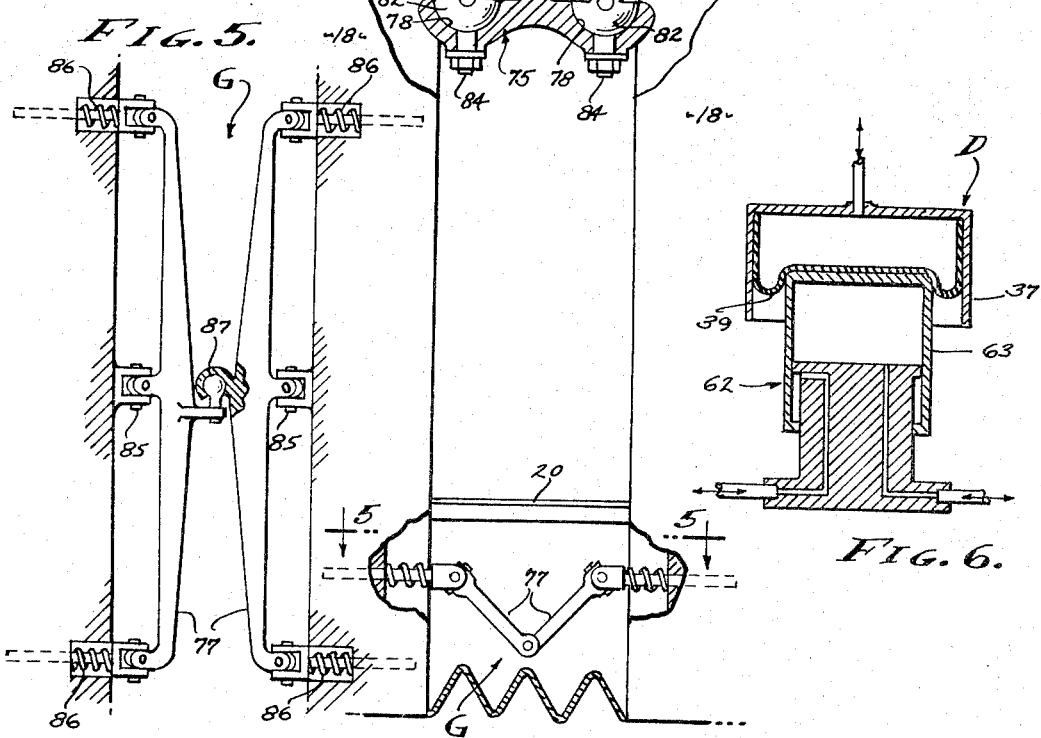

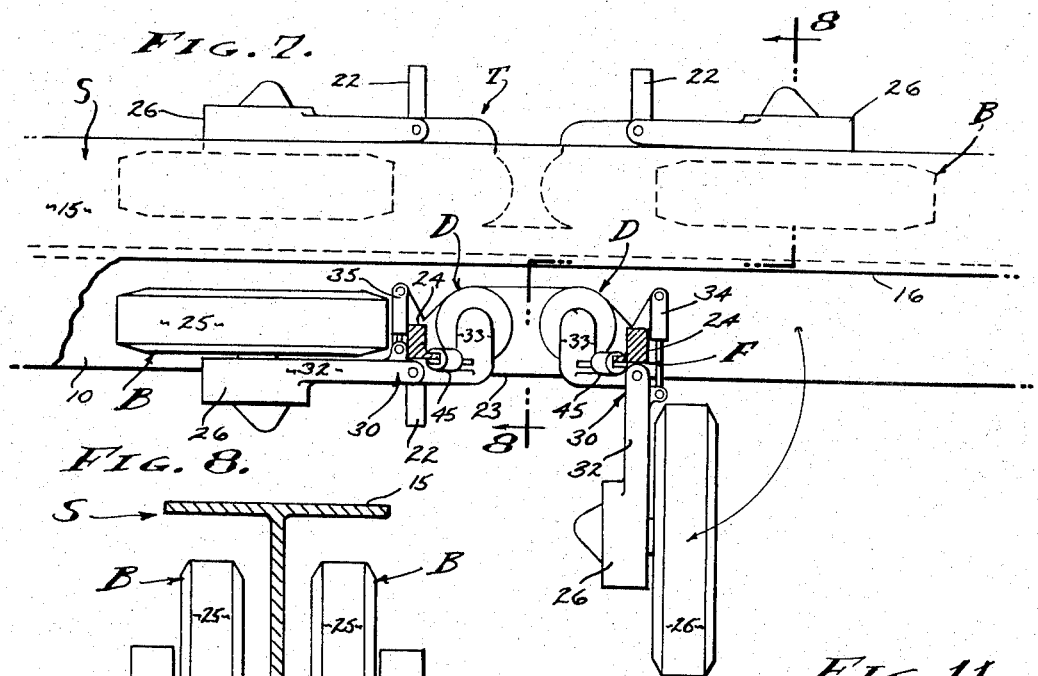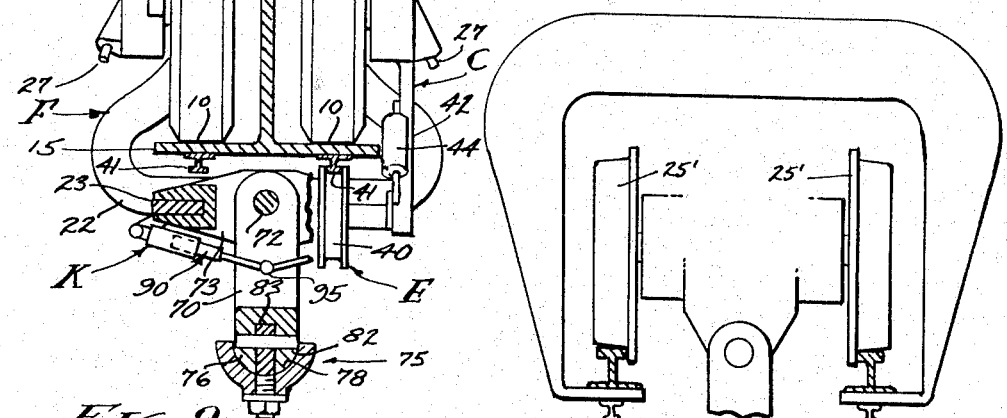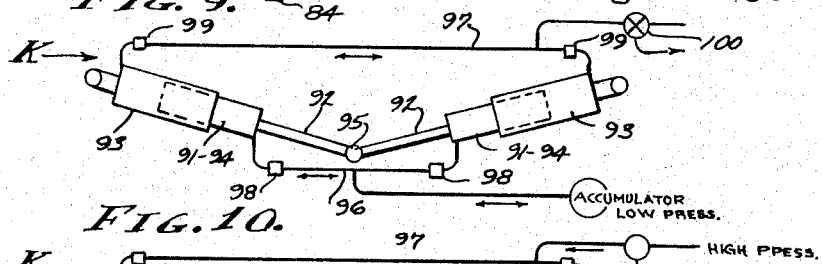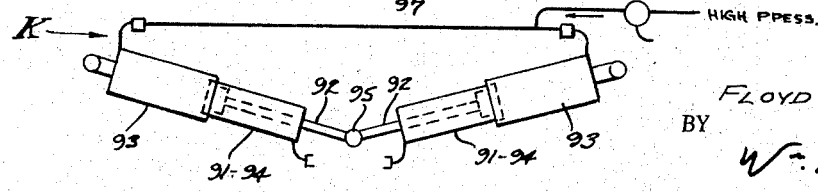

United States Patent Office 3,361,084
Patented Jan. 2, 1968

3,361,084
MONORAIL STRUCTURE AND
SYSTEM CONTROL
Floyd P. Ellzey, 2301 Marshallfield Lane,
Redondo Beach, Calif. 90278
Filed Oct. 24, 1965, Ser. No. 504,501
18 Claims. (Cl. 105—150)

ABSTRACT OF THE DISCLOSURE

This invention relates to monorail systems wherein vehicles are suspended from tracks for high speed transportation, providing such a structure that is conducive to smooth high speed operation. More particularly, this invention relates to the vehicular suspension and inter-section and/or inter-car coupling, and provides coupling together of monorail car bodies and related controls therefor.

---

Monorail transportation requires the erection of track, and this invention is concerned with the type of vehicle that is suspended from said track. The track erection can vary widely in engineering design concept, and is generally characterized by elongated track members that span from one support to another. Needless to say, deflections occur in said track members as vehicular loads are applied thereto, and consequently substantial imperfections appear in the ride of the vehicle. More particularly, it is the sagging of the track members as varying loads are applied thereto, the imperfections appearing dynamically as the vehicle moves along said track members. Further, there is always the probability of difficult installation and the probability of alteration in track configuration due to changing environmental conditions. Thus, it becomes apparent that the usual monorail transportation is subject to imperfect track and all of which is reflected in the normally accepted imperfect ride capabilities of the prior art vehicles.

An object of this invention is to improve the ride capabilities of track supported vehicles of the type under consideration, whereby imperfections in the supporting track structure are not reflected in the riding characteristics of the vehicle. With the present invention the vehicle is controlled so as to move in a plane independent of the supporting track structure, and to this end means is provided to control the height of the vehicle so that it remains at a predetermined plane of movement. It is to be understood, however, that said plane is not infinitely flat in the strict sense, and that said plane of movement is turned and/or deflected in a gradual and fair manner so as to negotiate inclines and turns, all as circumstances require.

Another object of this invention is to provide a bogie or truck that is responsive to seek a predetermined and controllable height independently of the suspension thereof and to the end that the vehicular body rides smoothly despite irregularities in the supporting track members. With the control and related structures hereinafter described the usual and prevalent undulations occurring in the track are erased from the vehicle ride, the vehicle seeking the plane of movement referred to in the preceding object.

It is also an object to provide a bogie or truck of the character referred to wherein the wheels thereof are independently sprung and to the end that unsprung weight is reduced to a minimum. With the structure to be described, the wheels per se independently support the truck and are in each instance independently operable and they are such as to be capable of being relieved from service while the vehicle remains in operation. To these ends, the individual wheels are retractably movable, and the bogie or truck per se is also shiftable with respect to the vehicular load, all to the end that damaged wheels are compensated for.

It is still another object to provide a bogie or truck of the character referred to wherein traction is controlled, and to the end that frictional engagement of the wheels is increased for and/or during the acceleration and deceleration phases of operation. With the present invention, idler wheels oppose the main support wheels, there being means to apply pressure in opposing the two wheels with the supporting track member therebetween.

It is still another object of this invention to provide improved coupling features in a bogie or truck of the character referred to wherein sway as between vehicle body sections is minimized and whereby sway of the cars is regulated as related to loading platforms and the like. To these ends, means is provided to minimize inter-section sway; and means is provided to position the cars relative to the plane of the supporting track member. Further, the inter-coupling of cars is made with a protective feature that prevents the jamming together of separate cars, these being the provision of shock means therefor.

The various objects and features of this invention will be fully understood from the following detailed description of the typical preferred form and application thereof, throughout which description reference is made to the accompanying drawings, in which:

FIG. 1 is a general side elevational view of the monorail structure showing the vehicles thereof suspended from the track member by means of the bogies or trucks which characterize the invention.

FIG. 2 is a typical cross-sectional view of the vehicle body employed and taken as indicated by line 2—2 on FIG. 1.

FIG. 3 is a detailed view of the element that is provided in order to establish the plane of movement of the vehicles.

FIG. 4 is an enlarged detailed view of one of the bogies or trucks shown in FIG. 1, with portions of the vehicle in section.

FIG. 5 is a plan sectional view showing a portion of the structure and taken as indicated by line 5—5 on FIG. 4.

FIG. 6 is an enlarged detailed sectional view showing the spring that is employed and the height controlling servo related thereto.

FIG. 7 is a plan view taken as indicated by line 7—7 on FIG. 4.

FIG. 8 is a cross-sectional view taken substantially as indicated by line 8—8 of FIG. 7, and FIGS. 9 and 10 are enlarged diagrams of a portion of the structure shown in FIG. 8.

FIG. 11 is a view of a modified form of the invention, similar to FIG. 8.

This invention relates to monorail transportation of the type wherein the vehicle V is suspended from a support S by bogies or trucks T. The vehicle V can vary widely in purpose and a passenger type vehicle body is shown; the support S can take many forms and in accordance with this invention it is a dual track support wherein there are laterally spaced tracks 10 for the support of the vehicle; and the trucks T are unique with the present invention as they are related to the support S and certain features of the vehicle V, all as hereinafter described.

As is best illustrated in FIG. 1, the monorail system involves a train of cars, each a vehicle V made up of articulated sections 11 depended from a series of trucks T. As indicated, there is a truck T at each end of the vehicle and there is a truck T at the joindure of adjacent sections 11 thereof. It is to be understood that the number of cars can vary and that the number of sections 11 making up a car can also vary, the vehicle suspension and intersection and inter-car coupling remaining the same as is shown in the drawings. Further, the manner of propulsion can vary widely as circumstances require and as a means by itself does not enter into the present invention, however as a drive means generally and/or as a brake means generally, the manner of propulsion is important as it is related to traction control means later described. Therefore, the cars are provided with propulsion means A, preferably in the form of a prime mover 12 carried on the vehicle section 11 and adapted to controllably revolve a propeller shaft 13. The propulsion means A includes a brake 14 and it is suitably controlled to cover the motion of the vehicle V, to accelerate the vehicle, to maintain cruising speeds thereof, and to decelerate the vehicle through dynamic breaking as well as through the conventional friction brake 14.

The monorail support S, as it is characterized by the present invention can be a downwardly disposed C-shaped cross-section as it is shown in FIG. 11, or it is preferably the more conventional I-beam cross-section as is shown throughout the remainder of the drawings. In either case, the support S involves a beam structure wherein there are upper and lower cap members 15 joined by one or more webs 16. In the case of the C-shaped support the tracks 10 are inwardly disposed from a pair of webs 16; and in the case of the I-beam shaped support the tracks 10 are outwardly disposed from a single central web 16. In either case the tracks 10 are horizontally disposed and normal to the web or webs 16, and the flanges or caps 15 of the beam cross-section so formed present the upwardly faced tracks. As is shown, the support is comprised of beam members arranged in abutted relationship, there being a depending hanger 17 (see FIG. 1) of high tensile, having hook-shaped elements projecting oppositely so as to simultaneously engage the abutted beams. The beams are arranged in alignment so as to be continuous, one of the other.

The vehicle V is, essentially, a light-weight fuselage structure of rigid formation, being comprised of a monocoque shell 18 supported from a horizontally disposed frame 19 and having a floor 20 supported in the shell and suspended and trussed by depending rods 21. The rods 21 are vertically disposed and carry the weight of the floor. The shell 18 is a self-reinforced envelope adapted to maintain its initially formed configuration, with suitable windows, doors, and other necessary openings therein.

In accordance with the invention I provide the bogie or truck T and which involves, generally, a frame F, two pairs of supporting wheels B, a lever support C for each of the wheels B, bias means D for each lever C carrying the vehicle V through engagement of the wheel B upon the track 10, traction means E engaged beneath the track 10 and opposed to the wheel B, and height control means H establishing a plane of movement of the vehicle close to said plane. Additionally, the invention is characterized by inter-section coupling means G, by sway control means K, and by inter-car shock coupling means R.

The frame F can vary in its mode of construction and is a rigid structure that embraces the I-beam track member. As shown, the frame F comprises transverse cross members 22 disposed beneath the track to rigidly space side members 23 that shiftably support the truck T. The truck T involves four independently sprung wheels B and accordingly the frame provides for the accommodation of four independently operable lever supports C and bias means D. Therefore, the frame has a standard 24 extended upward from each opposite end of the side member 23, there being two standards 24 at each side of the frame to pass alongside the track 10. In the event that a C-shaped track is employed, the frame is modified in a manner to incorporate opposite side members and standards into a centralized unit, as is clearly indicated in the drawings of frame F'.

The supporting wheels B are provided in pairs, there being a pair of wheels B at each side of the frame F. In the preferred form, the wheels are pneumatic tired, using a type of casing 25 common to trucks which employ pneumatic tires. It is to be understood that flanged train wheels 25' can be employed, in which case the track 10' is a railroad type track. As is preferred, the first mentioned pneumatic wheels B are employed and for stability there is a pair of such wheels at each side of the frame F, to engage on the oppositely projected tracks 10. Each wheel is journaled in an axle and traction unit 26 in which there are wheel bearings (not shown) and from which a drive shaft 27 projects. The drive shaft is engaged to revolve the wheel through gears (not shown) and is coupled to the prime mover 12 and brake 14 through the propulsion shaft 13. As shown, there are universal joints 28 at both ends of the propeller shaft 13 and said shaft telescopes so as to permit movement of the wheel B relative to the vehicle V.

The lever support C is provided at each wheel B and is a leading and/or trailing arm type of support. Accordingly, the support C involves a lever 30 pivoted on the standard at 31 so as to revolve on a transverse axis, spaced from and parallel to the wheel B axis. As is shown, a second class lever is employed wherein one arm 32 thereof extends to carry the traction unit 26 and wherein the other arm 33 thereof extends to be operated by the bias means D. The arms 32 and 33 move together on a bearing at 31, the arm 33 having a support member 34 at its terminal end for engagement with means D.

A feature of the present invention is the provision displacing the traction unit 26 and wheel B from their normal operating position, and to this end the arms 32 and 33 are articulated on an axis normal to the pivot 31 axis. It is the arm 32 that shifts and to the end that the traction unit 26 and wheel B are movable laterally away from the track engaged position. In order to automate this retraction of unit 26 and wheel B a cylinder and piston type hydraulically operated servo 35 is provided, that swings the arm 32 to alternate positions as is shown. The servo 35 is reversibly controlled by a manually operated valve 36, to effect these two positions, and suitable lock means is provided to secure the arms 32 and 33 in alignment for operation.

The bias means D for support of the vehicle V from the wheel B can be a conventional leaf or coil spring that absorbs shocks due to bumps and the like that occur along the track 10. A spring of the type under consideration is an air spring which is shown and which is employed for the advantages derived from its self-levelling action. That is, an air spring can be charged so as to compensate for changing loads imposed by the weight of the vehicle, and to this end I have shown an air spring comprising a shell 37 with a head having a socket 38 swivelly engageable with the support member 34, and a diaphragm 39 for support upon a member of the height control means H. In practice, the air spring includes the usual sensing elements (not shown) such as a weight sensitive air pressure regulation device responsive to the weight imposed by the vehicle V as and when it is loaded.

The traction means E is provided in accordance with the present invention to force the wheel B into tractive engagement with the track 10, and is therefore a pressure exerting means. The said means E is embodied in a pilot wheel 40 that tracks beneath the track 10 and in the case under consideration, employing pneumatic tires, the pilot wheel 40 is double flanged and engages upon a rail 41 that depends below the track 10. As is shown, the pilot wheel 40 rides along with its mated supporting wheel B and to this end the wheel 40 is carried from the traction unit 26, as by a leg 42 that depends from the unit to carry the wheel 40 on a transverse axis below the rail 41. In carrying out the invention, the pilot wheel 40 is movable relative to the wheel B and is carried upon a leading and/or trailing arm 43 that is shiftable so as to alternately move the pilot wheel into and out of rolling engagement with the rail 41. Accordingly, means is provided to shift the arm 43 and preferably a cylinder and piston means 44 that extends between the arm 43 and leg 42. In practice, the means 44 is normally biased with a low operating pressure to lift the pilot wheel 40 into light pressured engagement with the rail 41; and is adapted to be variable increased in bias of operating pressure to pull against the opposed wheel B. The control for variation in bias of the cylinder and piston means 44 is synchronized with and/or operated by the acceleration and braking controls of the vehicle, and is therefore such as to apply added traction pressure during the momentum changes that are imposed on the vehicle. Further, the pilot wheel 40 can be rimmed with a soft, sound deadening material in the nature of a tire; and the cylinder and piston unit 44 can be double acting the order to positively retract the wheel 40 as for example when the wheel B and its support lever C are articulated by the manual operation of valve 36.

Upon manual actuation of valve 36 to retract the wheels B and 40, the lever C is moved to lift the wheel B from track 10 by means of a cylinder and piston servo 45 which overpowers and depresses the air spring and simultaneously activates the servo 35 to retract the arm 32 and also to activate the cylinder and piston means 34 to lower the wheel 40. Thus, the three hydraulic cylinder and piston means operate to remove the wheels B and 40 from service. Further, and in accordance with the invention, relaxation of an individual wheel B from service is accomplished during operation, in case of a damaged wheel or blown tire, by operating servo 45 and means 44 alone (servo 35 remaining inoperated).

The height control means H is provided to work independently of the spring support of means D and is operative to sense a predetermined plane and to confine operation of the vehicle to said plane.

Accordingly, I provide generally, a plane establishment means 50, and a height displacement servo means 60. The plane establishment means 50 can vary in form and in its simplest and preferred form is a continuous elongate element 51 coextensive with the track 10, and parallel thereto, and installed accurately at the desired height and following straight lines and/or fair curves. In other words, the element 51 is a control element, or guide, and it is unstressed except that it carries its own weight and is not deflected due to engagement therewith by the servo means 60. As shown, element 51 is a wire tensioned between supports 52 and suspended as required on depending wires 53 from a suspension cable 54. The height displacement servo means 60 involves a follower 61 that is urged lightly into engagement with the element 51, which serves as a trolley that furnishes electrical motive power to the vehicle, to position height sensitive servo operating valves.

The servo means 60 provides a double acting cylinder and piston servo 62 having a movable ram member 63 which affords the movable support for carrying the diaphragm of the means D; and in this case there are two servo operating valves, one a lowering valve 64 and the other a raising valve 65. The valves 64 and 65 are positioned by a trolley arm 66 that carries a brush or shoe 67 that rides upon the element 51. The valves 64 and 65 are responsive to slight variations and are operable inversely with respect to each other, to supply and to exhaust fluid from opposite ends of the cylinder and piston servo 62. Thus, assuming that the monorail track member has sagged, the trolley arm 66 will raise and thereby activate the valve 64 in order to admit fluid into the servo 62 to raise the ram member 63, while the valve 65 exhausts fluid. On the contrary, assuming the reverse situation the valve 65 is actuated in order to admit fluid into the servo 62 to lower the ram member 63, while valve 64 exhausts fluid. Commercially available servo systems are used to perform the above stated functions, whereby the position of the ram member 63 dynamically reflects the height position of the element 51.

The inter-section 11 coupling means G is unique with the present invention and comprises a swing 70 and universal hook 75. The swing 70 is disposed to hang vertically from the center of the truck T and is carried on a pivot 72 disposed fore and aft at the center plane of the structure. The pivot 72 is supported on a longitudinally shiftable carriage 73 slideable on the side members 23 of the frame F, there being a cylinder and piston means 74 to position the carriage relative to the frame. The carriage has three positions imposed thereon by the cylinder and piston means 74, one a central position as shown, secondly a forward position employed to remove weight from a rear wheel B, and thirdly a rearward position employed to remove weight from a front wheel B. A valve 80 is provided to control the cylinder and piston means 74 to effect said three positions of the carriage.

The universal hook 75 comprises a swivel 76 to hang abutted car section ends in juxtaposed relation, and coupled rockers 77 projecting from said abutted car section ends. As clearly shown in FIGS. 4 and 5 the swivel 76 involves an upwardly faced socket 78 at the lower terminal end of the swing 70, there being a separate socket for each of the abutted car sections as shown. In the event that the individual end of a car section is to be suspended, then a single socket 78 is provided. The car section 11 is provided with a tongue 81 having a ball member 82 engaged in the socket, said member 82 being bifurcated to receive a spherical contoured plate 83. The plate 83 is pivotally anchored in the socket 78 by a centrally disposed bolt 84. Cooperating with the swivel 76 are the coupled rockers 77, each of which is joined to its section 11 at the central plane thereof and near the bottom of the vehicle. As is shown, the rockers are joined to the section by means of universals 85 and they extend transversely to opposite sides of the section ends where they are engaged with longitudinally disposed and compressible springs 86. The springs 86 are compressed, equally, to center the rockers 77 and in practice they are coupled to the rockers by universals. The said rockers 77 are angularly related and are universally joined at the center of the structure by means of a ball and socket 87. As a result, the adjacently abutted car section ends are urged into alignment while depending swivelly from the universal hooks 75.

The sway control means K is provided to permit the vehicle bodies to depend vertically by the action of gravity; to damp any extraordinary motion from the vertical plane; and to fix the vehicle suspended vertically with respect to the track 10 when so desired. As shown, the means K is a bungee means comprising opposed hydraulically controlled normally yielding cylinder and piston means 90. The said bungees are alike and each is comprised of a low pressure motion absorbing cylinder 91 and rod 92, and the high pressure position controlling cylinder 93 and ram 94. In accordance with the invention the cylinder 91 and ram 94 are one and the same part, the combination of bungees being telescopically related. As is shown, the high pressure bungees are pivoted to each opposite side of the frame F, while the two rods 92 are pivoted at a common pin 95 to the swing 70. The pairs of cylinders 91 and 93 are independently interconnected by hydraulic transfer lines 96 and 97 respectively, there being orificed restrictory beans 98 and 99 in said lines and at each cylinder respectively; and thus, the transfer of fluid transversely is restricted. In accordance with the invention, the low pressure bungees are supplied with fluid under suitable pressure from an accumulator or the like; while the high pressure bungees are forcibly extended by the application of fluid pressure from a valve controlled source. Accordingly, a valve 100 is provided on frame F and operated by a cam 101 that parallels the track 10, to open the valve and to thereby extend the high pressure bungees so as to center the swing 70. It is to be understood that a suitable source of fluid pressure, including reservoirs and accumulators, is provided to operate the various pistons etc.

The inter-car shock coupling R is a bungee tongue that telescopes longitudinally. As shown, there is a tongue 105 swivelled to the end of one car and extended to a releasable coupling 110 at the next car. The free end of the tongue 105 is supported by wheels 106 and guided by pilots 107, corresponding to the wheels B and 40 above described.

Having described only a typical preferred form and application of my invention, I do not wish to be limited or restricted to the specific details herein set forth, but wish to reserve to myself any modifications or variations that may appear to those skilled in the art and fall within the scope of the following claims.

Having described my invention, I claim:

1. A monorail truck for the suspension of a vehicular body from a track, and including, a frame and a traction wheel journaled on bearings in a drive unit supporting the frame through engagement upon the track and having a suspension with springs to absorb shocks due to irregularities in the track, and traction means on the frame for urging said traction wheel into pressured engagement with the supporting surface of the track and comprising an underlying pilot wheel engaged under the track and means responsive to acceleration and/or deceleration of the truck to increase the pressured engagement of the pilot wheel against the track in opposition to the first mentioned traction wheel.

2. A monorail truck for the suspension of a vehicular body from a track, and including, a frame and a traction wheel journaled on bearings in a drive unit carried on and pivoted from and supporting the frame through engagement upon the track and having a suspension with springs to absorb shocks due to irregularities in the track, and traction means carried on said drive unit for urging said traction wheel into pressured engagement with the supporting surface of the track and comprising an underlying pilot wheel engaged under the track and means responsive to acceleration and/or deceleration of the truck to increase the pressured engagement of the pilot wheel against the track in opposition to the first mentioned traction wheel.

3. A monorail truck for the suspension of a vehicular body from a track, and including, a frame and a traction wheel journaled on bearings in a drive unit carried on and pivoted from and supporting the frame through engagement upon the track and having a suspension with springs to absorb shocks due to irregularities in the track, and traction means carried on said drive unit for urging said traction wheel into pressured engagement with the supporting surface of the track and comprising an arm pivoted to a depending leg on the drive unit and a pilot wheel journaled on bearings in the said arm and engaged under the track and means responsive to acceleration and/or deceleration of the truck to increase the pressured engagement of the pilot wheel against the track in opposition to the first mentioned traction wheel.

4. A monorail truck for the suspension of a vehicular body from a track, and including, a frame and a pair of traction wheels arranged in tandem and the frame and to absorb shocks due to irregularities through rolling engagement of the traction wheel upon the track, each of said arms being sectional and having a laterally retractable section carrying a drive unit, and means at each arm to move said retractable arm section and drive unit laterally to displace the traction wheel from the track.

5. A monorail truck for the suspension of a vehicular body from a track, and including, a frame and a pair of traction wheels arranged in tandem and journaled horizontally on normally transversely disposed bearings in independent drive units carried on arms pivoted vertically in the frame and biased with springs to support the frame and to absorb shocks due to irregularities through rolling engagement of the traction wheels upon the track, each of said arms being sectional and having a laterally retractable section carrying a drive unit, and means at each arm to revolve the arm on its pivot in the frame to lift the drive unit and traction wheel and thereby relax engagement thereof upon the track.

6. A monorail truck for the suspension of a vehicular body from a track, and including, a frame and a pair of traction wheels arranged in tandem and journaled horizontally on normally transversely disposed bearings in independent drive units carried on arms pivoted vertically in the frame and biased with springs to support the frame and to absorb shocks due to irregularities through rolling engagement of the traction wheels upon the track, each of said arms being sectional and having a laterally retractable section carrying a drive unit, means at each arm to revolve the arm on its pivot in the frame to lift the drive unit and traction wheel from the track, and means at each arm to move said retractable arm section and drive unit laterally to displace the traction wheel from the track.

7. A monorail truck for the suspension of a vehicular body from a track, and including, a frame and a pair of traction wheels arranged in tandem and journaled on bearings in independent drive units carried on arms pivoted from the frame and biased with springs to support the frame and to absorb shocks due to irregularities through engagement of the wheels upon the track, each of said arms being sectional and having a laterally retractable section carrying a drive unit, traction means at each drive unit and shiftably carried from and for urging the traction unit and wheel thereof into pressured engagement with the supporting surface of the track and comprising an underlying pilot wheel engaged under the track, and means at each arm simultaneously shifting the traction means away from the track and to revolve the arm on its pivot in the frame to lift the drive unit and traction wheel and thereby relax engagement thereof upon the track.

8. A monorail truck for the suspension of a vehicular body from a track, and including, a frame and a pair of traction wheels arranged in tandem and journaled on bearings in independent drive units carried on arms pivoted from the frame and biased with springs to support the frame and to absorb shocks due to irregularities through engagement of the wheels upon the track, each of said arms being sectional and having a laterally retractable section carrying a drive unit, traction means at each drive unit and shiftably carried from and for urging the traction unit and wheel thereof into pressured engagement with the supporting surface of the track and comprising an underlying pilot wheel engaged under the track, means at each arm simultaneously shifting the traction means away from the track, means to revolve the arm on its pivot in the frame to lift the drive unit and traction wheel from the track, and means at each arm to move said retractable arm section and drive unit laterally to displace the traction wheel from the track.

9. A monorail truck as set forth in claim 1 for movement horizontally at a controlled height, and including, height control means operable independent from the truck suspension and comprising an element adjacent to and placed at a predetermined height relative to the track and sensing the height of said element and adjusting the extending coextensively with the track, and a servo means truck suspension to a position coincident with the said height.

10. A monorail truck as set forth in calim 1 for movement horizontally at a controlled height, and including, height control means operable independent from the truck suspension and comprising an element adjacent to and placed at a predetermined height relative to the track and extending coextensively with the track, and a servo means sensing the height of said element and adjusting the said spring support of the truck suspension to a position coincident with the said height.

11. A monorail truck as set forth in claim 1 for movement horizontally at a controlled height, and including, height control means operable independent from the truck suspension and comprising an element adjacent to and placed at a predetermined height relative to the track and extending coextensively with the track, and a servo means with a sensor movably engaged with said element and a movable ram responsive to the sensor to place the said spring support of the truck suspension at a position coincident with the relative height of said element.

12. A monorail truck as set forth in claim 1 for movement horizontally at a controlled height, and including, height control means operable independent from the truck suspension and comprising an element adjacent to and placed at a predetermined height relative to the track and extending coextensively with the track, and a servo means with a position sensitive valve movably engaged with said element and a cylinder and piston unit with a ram responsive to the position of the valve to adjustably place the said spring support of the truck suspension at a position coincident with the relative height of said arrangement.

13. A monorail truck as set forth in claim 1 for movement horizontally at a controlled height, and including, height control means operable independent from the truck suspension and comprising an element adjacent to and placed at a predetermined height relative to the track and extending coextensively with the track, and servo means with position sensitive valves movably engaged with said element and sensitive to displacement of the truck above and below the height of said element and with a double acting ram responsive to the positions of the valves to raise and lower the said spring support of the truck suspension to maintain the same at a position coincident with the relative height of said element.

14. A monorail truck as set forth in claim 1 for movement horizontally at a controlled height, wherein the springs are self levelling pneumatic spring and includes a control system with a movable spring support to absorb shocks due to irregularities in the track, and including height control means operable independent from the truck suspension and comprising an element adjacent to and placed at a predetermined height relative to the track and extending coextensively with the track, and servo means with position sensitive valves movably engaged with said element and sensitive to displacement of the truck above and below the height of said element and with a double acting ram responsive to the positions of the valves to raise and lower the said spring support of the truck suspension to maintain the same at a position coincident with the relative height of said element.

15. A monorail truck as set forth in claim 1 for permitting articulation abutted sections, and including, a suspension member depending from the frame and swivelly coupled to the adjacently abutted sections at the upper portion of the vehicular body, and an inter-section coupling at the lower portion of said abutted sections yieldingly limiting lateral as well as longitudinal misalignments.

16. A monorail truck as set forth in claim 1 for permitting articulation abutted sections, and including, a suspension member depending from the frame and swivelly coupled to the adjacent abutted sections at the upper portion of the vehicular body, and an intersection coupling at the lower portion of said abutted section and comprising inter-connected rockers pivoted to opposed ends of the sections and spring means centering the rockers respectively.

17. A monorail truck for the suspension of a vehicular body from a track, and including, a frame and a pair of traction wheels arranged in tandem and journaled on bearings in independent drive units carried on arms pivoted from the frame and biased with springs to support the frame and to absorb shocks due to irregularities through engagement of the wheels upon the track, each of said arms being sectional and having a laterally retractable section carrying a drive unit, means at each arm to revolve the arm on its pivot in the frame to lift the drive unit and traction wheel from the track, means at each arm to move said retractable arm section and drive unit laterally to displace the traction wheel from the track, a suspension member depending from the frame and shiftable longitudinally thereof and coupled to the vehicular body, and means to position the suspension member longitudinally relative to the frame to move the load imposed upon the frame by the weight of the body.

18. A monorail truck as set forth in claim 17 for shifting the load imposed thereof, and wherein the suspension member normally depends centrally from the frame, and the means to position the suspension member longitudinally relative to the frame positions the said suspension member toward the pair of wheels to move the load imposed upon the frame by the weight of the body.

References Cited

UNITED STATES PATENTS

| | | | |
|---|---|---|---|
| 2,439,986 | 4/1948 | Rennie | 104—93 |
| 3,060,867 | 10/1962 | Holmquist | 105—145 |
| 3,106,171 | 10/1963 | Julien | 105—149 X |

FOREIGN PATENTS 486,477  9/1952  Canada.

ARTHUR L. LA POINT, *Primary Examiner.*

J. E. BABER, *Assistant Examiner.*